G. E. VANDERBURGH.

Treating Alkalies.

1,675.

Reissued May 17, 1864.

Witnesses:

Lemuel W. Serrell

Chas. C. Smith

Inventor:

George E. Vanderburgh.

UNITED STATES PATENT OFFICE.

GEORGE E. VAN DERBURGH, OF MAMARONECK, NEW YORK, ASSIGNOR, BY MESNE ASSIGNMENTS, TO NEW YORK QUARTZ COMPANY, OF NEW YORK.

IMPROVEMENT IN APPARATUS FOR TREATING SILICIOUS SUBSTANCES.

Specification forming part of Letters Patent No. 28,540, dated May 29, 1860; Reissue No. 1,297, dated April 1, 1862; Reissue No. 1,675, dated May 17, 1864.

DIVISION B.

*To all whom it may concern:*

Be it known that I, GEORGE E. VAN DERBURGH, of Mamaroneck, in the county of Westchester and State of New York, have invented a new and improved digesting apparatus to be used in connection with superheated steam for the purpose of reducing silicious and other refractory substances to a liquid or gelatinous state; and I do hereby declare that the following is a full, clear, and exact description of my invention.

My said improved digesting apparatus is constructed in such a manner that the substance to be dissolved therein will, when the apparatus is in operation, be continuously raised above the surface of the liquid in the lower portion of the digesting-chamber and into direct contact with jets or currents of superheated steam admitted from suitable conductors into the upper portion of said chamber.

Figure 1:
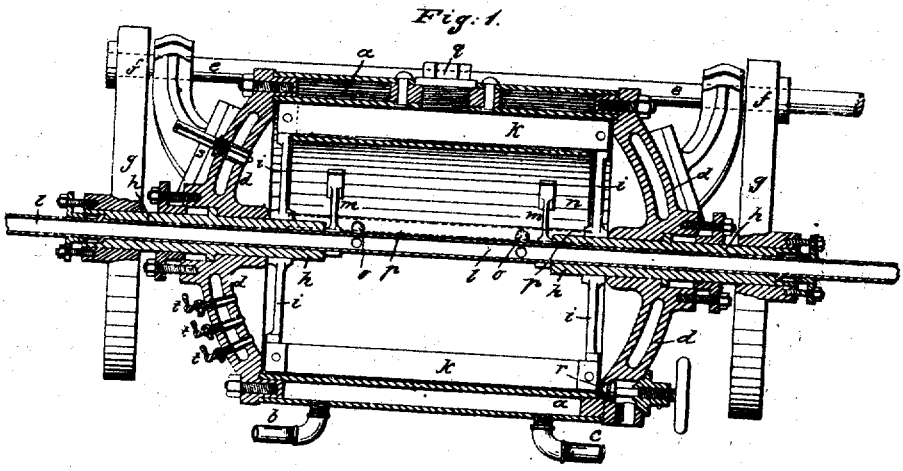
Figure 2:
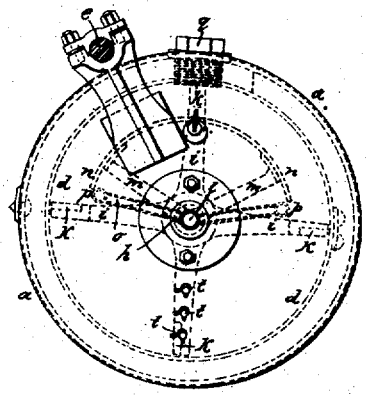

In the accompanying drawings, which form a part of this specification, Figure 1 is a longitudinal section, and Fig. 2 an end view, of a digesting-chamber provided with suitable revolving buckets, which, in connection with the necessary conducting-pipes, discharge-valves, &c., constitutes my improved apparatus for the treatment of silicious and other refractory substances.

This digesting-chamber may be of a cylindrical shape, and may be composed of double sides *a a*, and double heads *d d*, combined with each other in any suitable manner. The heads *d d* of said chamber are centrally perforated for the reception of the short hollow shafts *h h*, which work in packing-boxes within said perforations. The pipe *l*, which conducts the superheated steam into the digester, passes through the shafts *h h*, and the joints between the said pipes are rendered steam-tight by means of any suitable packing. The hollow shafts *h h* have radial arms upon their inner ends which are connected to elevators *k k* within the digester, that extend the entire length of the same, while their outer edges are brought nearly in contact with the inner casing of the digester. Arms *m m* from the main steam-pipe *l* support the curved shield *n*, and radial hollow arms *o o* from the said steam-pipe *l* support the slitted longitudinal steam pipes *p p*, which discharge the superheated steam into the digester. The proportions of the above-mentioned parts are such that the elevators *k k* can revolve freely around the shield *n* and the slitted steam-pipes *p p*. Motion is imparted to the elevators *k k* by means of the toothed wheels *g g* on the shafts *h h* and the pinions *f f* on the driving-shaft *e*. The said digester is provided with a man-hole and with other suitable valve-closed openings, and also with an instrument for indicating the temperature within the same.

*q* is the man-hole stopper; *r*, the valve that closes the aperture through which the silicate is withdrawn from the digester; *t t*, the try-cocks, and *s* the instrument for indicating the temperature within the digester.

Steam is admitted into the spaces between the double heads and double sides of my improved digester for the purpose of preventing the condensation of the superhead steam which is introduced into the inner chamber.

Suitable pipes are provided for drawing off the water produced by the condensation of this protecting body of steam.

If preferred, the digester may be made of a single thickness of metal and be "walled in" with brick or other suitable material, for the purpose of preventing the contact of the atmospheric air with the metallic surface of the digester, and the consequent condensation of the superheated steam therein.

The operation of this apparatus is as follows: I place within the digesting-chamber a suitable quantity of water, and then charge the apparatus through the man-hole with the proper quantity of the substance intended to be dissolved. The superheated steam is now admitted through the pipes provided for that purpose and a revolving motion imparted to the elevators. As each bucket or elevator *k* passes through the substance placed in the bottom of the digester, it becomes charged with a portion thereof, which is elevated until brought into contact with the current or currents of superheated steam admitted into the chamber as aforesaid. The effect of this contact is to dissolve a portion of the substance acted upon, which dissolved portion, as the bucket continues its revolution, is "taken up" by the water in the bottom of the chamber. At each revolution of the buckets some portion of the solid substance is reduced to a liquid or gelatinous state, until finally the entire mass is so reduced, when it is withdrawn from the digester, and the apparatus is ready to be recharged for another operation.

The silicious or other refractory substance, if submitted to the action of the superheated steam without being previously immersed in the water, would probably be decomposed thereby.

I do not intend to limit myself to any precise method of constructing my improved digesting apparatus, provided it be so constructed as to enable the substance placed therein for the purpose of being dissolved to be continuously elevated above the surface of the liquid or gelatinous matter in the lower portion of the digesting-chamber, and into direct contact with currents or jets of superheated steam in the upper portion of the same.

What I claim as my invention, and desire to secure by Letters Patent, is—

The employment of superheated steam in a digesting apparatus constructed and operating substantially in the manner herein represented and described, for the purpose of reducing silicious and other refractory substances to a liquid or gelatinous state.

The foregoing specification signed this 8th day of April, 1864.

GEORGE E. VAN DERBURGH.

Witnesses:
GEO. A. MAYHEW,
CHARLES DRAKE.